March 2, 1926.

H. D. SMITH 1,575,390

ELEVATOR FLOOR INDICATOR DEVICE

Filed March 30, 1923

H. Dutton Smith
INVENTOR.

BY
L. Stewart Gatter
ATTORNEY.

Patented Mar. 2, 1926.

1,575,390

UNITED STATES PATENT OFFICE.

HENRY DUTTON SMITH, OF NEW YORK, N. Y.

ELEVATOR FLOOR-INDICATOR DEVICE.

Application filed March 30, 1923. Serial No. 628,941.

*To all whom it may concern:*

Be it known that I, HENRY DUTTON SMITH, a citizen of the United States, and a resident of the city, county, and State of New York, have invented certain new and useful Improvements in an Elevator Floor-Indicator Device, as set forth in the following specification.

My invention relates to a floor indicator device for elevator cars which will automatically act in a manner to indicate to the operator the number of the floor which he is approaching, thus enabling the operator to determine when to shut off the power so that a suitable stop may be made. This may be accomplished by mechanical or electrical means, or by a combination of both, and by locating part of the mechanism in the "overhead" and part in the car itself, or by locating it wholly overhead or below, or wholly in the car. I will describe, however, one mechanical device I use, in which the mechanism is wholly in the car, and which consists in the new and novel construction and combination of the several parts, as will be hereinafter set forth, and is a simple and inexpensive device for accomplishing the purpose.

It has been found that simply painting the numbers on the floor landings to guide the operator is not sufficient guide to enable him to make proper stops, especially on high speed cars, and with the advent of the so-called microdrive machine and multi-voltage control, high speed cars, even in excess of 800 ft. per minute may be expected. With cars of that speed the floors are passed so rapidly that it is difficult for the operator to gauge his shut-off point, and by the use of my invention, especially the device described with the "stadia-like" dial face, he is enabled to absolutely determine his position at all points in the hatchway, and to shut off his power at proper points to make accurate stops, thereby eliminating the waste and delay incident to a repeated shutting off and turning on of the power, familiarly known as "jockeying", in order to reach a proper level.

A further object of my invention is to provide a device adapted to accomplish these results, having an easily adjustable connection between the indicator and the dial face by friction means or otherwise, so that any slight creeping or slip in the driving mechanism of the device itself may be readily compensated and corrected by turning the indicator about the face of the dial manually, to correspond with any position in which the car may be at that time in the hatchway, and to provide plugs or protrusions extending from the face of the dial to engage the indicator pointer at the upper and lower limits of travel in the event of such creeping, and automatically cause the indicator pointer to return to a position corresponding accurately with the position of the car in the hatchway.

It is a further object of my invention to place this signal device in the car so that the operator can observe it at the same time he observes his stop signals, and with my device it would be possible to entirely close the car, having a gate which would shut off a view of the landings and the floor numerals on the landings, as same would not be necessary. This would result in obtaining much better schedules because the operator would be unable to see any passengers through the glass doors, as at present, and hence would not stop and run back to pick them up, although they had given no signal, and thereby cause delay in service, but would on the contrary be compelled to run entirely on signals.

Referring to the accompanying drawing, forming a part of this specification, like letters refer to like parts in all the different views.

Figure 1:
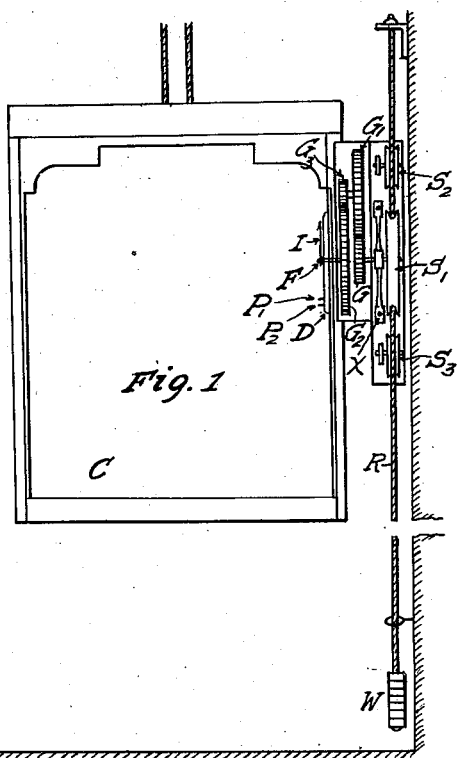
Figure 1 is a diagrammatic cross-section through the car and type of signal device I have selected to illustrate my invention, showing the means of connecting the device to the car.

The car C in Figure 1 may be of any approved construction, and the dial D of my device is mounted inside the car in the panel thereof, either elevated or flush with the sides of the panel. I have shown it in my drawing in a non-flush mounting.

Figure 4:
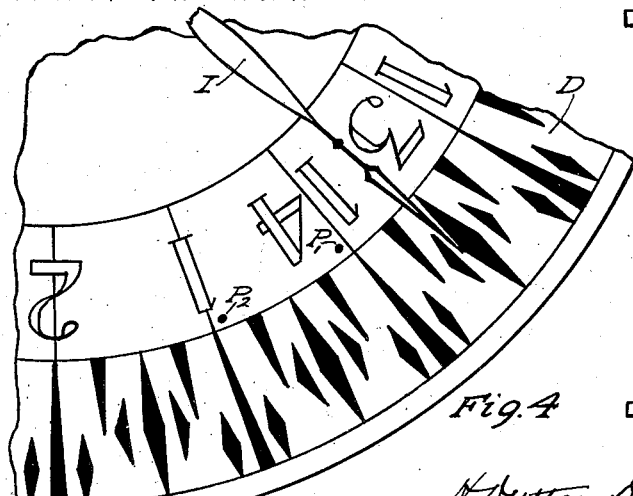
Figure 4 is a front elevation of a segment of a preferred embodiment of a stadia-like dial face for the device.
Figure 3:
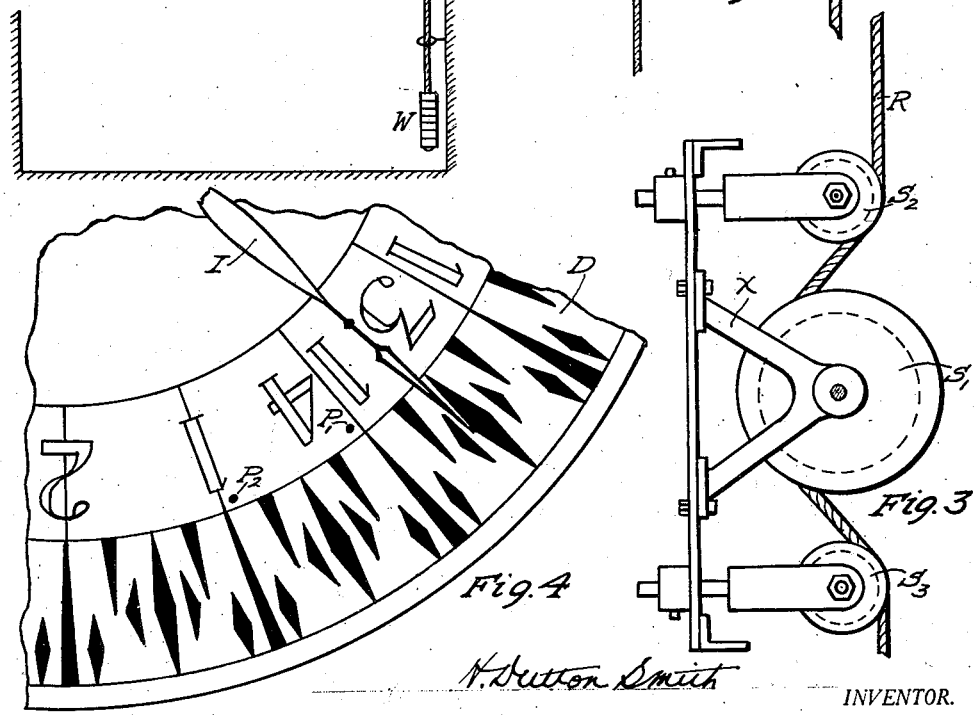
Figure 3 is a side elevation of the friction driving mechanism.

I prefer to construct the face of the dial D so that it will resemble the familiar stadia rulings in surveying, which have the effect of enabling the eye to determine quickly and readily any point of indication, as for example in Figure 4 it is immediately seen that the indicator I shows that the car is just beyond the half-way point and not quite to the ⅝ths point of the distance between the 13th and 14th floors.

It is to be understood that I do not confine myself to the particular stadia-like design shown in Figure 4.

Figure 2:
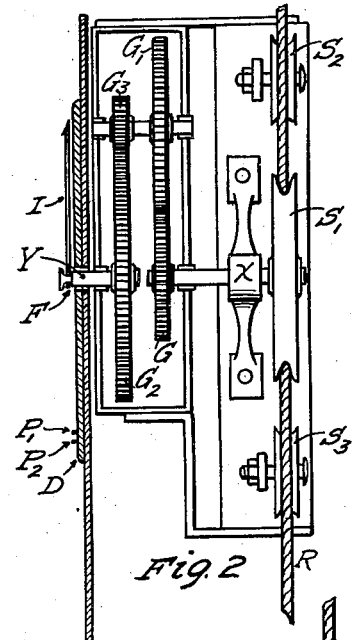
Figure 2 is an end elevation in semi-cross-section of this type of device itself, with the cover removed.

Referring again to Figure 2, the dial I in my device I prefer to attach to its driving axle Y by means of the friction plug F, so that should any creeping or slipping occur in the driving portion of the device it may be readily compensated for by the adjustment of this friction plug, or by the pointer engaging the protrusions $P_1$ or $P_2$ at the upper or lower limits of travel, in the event of any creeping, and thereby automatically adjusting itself. As will immediately appear from the drawing, the indicator I is driven by means of the action of the friction of the rope R on the sheaves $S_1$, $S_2$ and $S_3$, particularly the sheave $S_1$ mounted on the bracket X which functions to rotate the indicator by means of the mechanical advantage obtained with the two spur gear reductions G, $G_1$, $G_2$ and $G_3$, the rope R being held in tension by means of the weight W at the bottom of the hatchway, and it will readily be seen that as the car goes up or down the hatchway the traction caused by the bending of the rope R about the sheaves $S_1$, $S_2$ and $S_3$ will cause the sheave $S_1$ to rotate proportionately to the travel of the car and cause a corresponding rotation of the indicator I about the face of the dial D. It will be seen that I have constructed an indicator signal device by means of which, and in an entirely automatic manner, the operator may observe his exact position in the hatchway, and therefore be in a position to shut off the power at a predetermined point to enable him to make accurate stops. It is to be understood of course that I am not confined to the particular mechanical device or means described herein for accomplishing the objects of my invention as disclosed, but that it is a preferred embodiment.

What I desire to secure by U. S. Letters Patent is:

1. In an elevator floor indicator device, the combination of a driving rope weighted and suspended in the hatchway with a bracket mounted on an elevator cab supporting sheaves adapted to frictionally drive an operating sheave, a double set of reduction spur gearing, an indicator pointer shaft and an indicator pointer adjustably connected therewith visible from within said cab, a dial indicator face containing floor numbers and stadia-like segmentations marked thereon likewise visible from within said cab and with pointer engaging protrusions at both ends of travel of said dial indicator, all substantially as and for the purposes hereinbefore set forth.

2. In an elevator floor indicator device, the combination of a driving cable suspended in the hatchway in engagement with driving means attached to an elevator cab, said driving means operating through a mechanical advantage to cause a dial indicator with floor numbers mounted in and visible from within said cab to operate, all substantially as and for the purposes hereinbefore set forth.

In witness whereof I hereunto sign my name this 23rd day of March, 1923.

H. DUTTON SMITH.